United States Patent
Bazin et al.

(10) Patent No.: US 7,275,564 B2
(45) Date of Patent: Oct. 2, 2007

(54) PIGGING BALL VALVE

(75) Inventors: Allan Bazin, Edmonton (CA); Randy Wiltermuth, Edmonton (CA)

(73) Assignee: Argus Machine Co. Ltd., Edmonton, Alberta (CA)

( * ) Notice: Subject to any disclaimer, the term of this patent is extended or adjusted under 35 U.S.C. 154(b) by 0 days.

(21) Appl. No.: 11/008,373

(22) Filed: Dec. 8, 2004

(65) Prior Publication Data

US 2006/0065314 A1    Mar. 30, 2006

(51) Int. Cl.
*F16K 25/02*    (2006.01)

(52) U.S. Cl. .................. 137/625.47; 251/172; 251/174

(58) Field of Classification Search ........... 137/625.46, 137/625.47; 251/172, 174; 138/8
See application file for complete search history.

(56) References Cited

U.S. PATENT DOCUMENTS

| | | | | |
|---|---|---|---|---|
| 2,916,254 A * | 12/1959 | Wendell | ...................... | 251/172 |
| 3,039,641 A | 6/1962 | Rosan | | |
| 3,177,513 A | 4/1965 | Ellett | | |
| 3,288,163 A * | 11/1966 | Craven | ........................ | 137/242 |
| 3,378,026 A * | 4/1968 | Oliver | .................... | 137/246.22 |
| 3,379,410 A * | 4/1968 | Stewart, Jr. | .................. | 251/359 |
| 3,416,558 A * | 12/1968 | Works | .................... | 137/246.22 |
| 3,421,733 A * | 1/1969 | Stewart, Jr. | .................. | 251/172 |
| 3,565,392 A * | 2/1971 | Bryant et al. | ................ | 251/159 |
| 3,584,641 A * | 6/1971 | Milleville et al. | ..... | 137/246.15 |
| 3,656,498 A * | 4/1972 | Grove et al. | ........... | 137/246.22 |
| 3,780,986 A | 12/1973 | Fujiwara | | |
| 3,834,664 A * | 9/1974 | Atkinson | ...................... | 251/174 |
| 3,856,261 A * | 12/1974 | Jourdan | ....................... | 251/172 |
| 3,870,071 A * | 3/1975 | Graham et al. | ............. | 137/527 |
| 4,137,936 A * | 2/1979 | Sekimoto et al. | ....... | 137/246.22 |
| 4,226,258 A * | 10/1980 | Nakanishi | .................... | 137/208 |
| 4,226,263 A | 10/1980 | Muchow | | |
| 4,247,080 A | 1/1981 | Morrison | | |
| 4,262,688 A * | 4/1981 | Bialkowski | ................. | 137/242 |
| 4,386,756 A * | 6/1983 | Muchow | ...................... | 251/172 |
| 4,572,298 A | 2/1986 | Weston | | |

(Continued)

FOREIGN PATENT DOCUMENTS

CA    2189609    2/1998

(Continued)

OTHER PUBLICATIONS

Argus Pig Valve, Argus Machine Co. Ltd., product brochure, dated 1994, Edmonton, canada, 2 pages.

(Continued)

*Primary Examiner*—John Fox
(74) *Attorney, Agent, or Firm*—Pedersen & Co., PLLC; Ken J. Pedersen; Barbara S. Pedersen

(57) ABSTRACT

A pigging ball valve with a housing and ball core supported for rotation within the housing. The ball core sits on a valve seat, which is supported by a seat carrier. The valve seat carrier has three distinct diameters that locate the seat in the housing and thus provides an anti-cocking feature. A seat insert has a pressure sealing surface and wiper lip on the outer diameter of the pressure sealing surface. An internal seat deflector ring is provided inside of the pressure sealing surface. The seat carrier is spring loaded.

7 Claims, 2 Drawing Sheets

U.S. PATENT DOCUMENTS

| | | |
|---|---|---|
| 4,681,133 A | 7/1987 | Weston |
| 4,703,807 A | 11/1987 | Weston |
| 5,533,738 A * | 7/1996 | Hoffmann .................. 277/388 |
| 5,624,101 A | 4/1997 | Beson |
| 5,752,690 A | 5/1998 | Ellett |
| 6,079,074 A | 6/2000 | Ellett |
| 6,409,843 B1 | 6/2002 | Ellett |

FOREIGN PATENT DOCUMENTS

| | | |
|---|---|---|
| CA | 2197277 | 8/1998 |
| CA | 2406478 | 3/2003 |
| WO | WO84/01799 A1 | 5/1984 |

OTHER PUBLICATIONS

Nutron Manufacturing Ltd. Ball Valve Catalogue, Feb. 1987, 8 pages (particularly p. 5, top right side).

W-K-M Dynaseal 310 Ball Valves, Dec. 1993, 44 pages (particularly, for example, p. 4, bottom).

* cited by examiner

PIGGING BALL VALVE

This application claims priority of Canadian Application No. 2,480,501 filed Sep. 28, 2004, and entitled "PIGGING BALL VALVE", which is hereby incorporated by reference.

BACKGROUND OF THE INVENTION

Pigs are round or cylindrical objects used for cleaning pipelines. The pigs are introduced into the pipeline through a pigging ball valve and carried by fluid pressure through the pipeline to an extraction point, usually another pigging ball valve. The pigging ball valves must be carefully designed to allow introduction or removal of the pig without a risk of release of high pressure fluids from the pipeline, either during introduction or removal of the pig or while the pigging ball valve is not being used. In addition, the pigging ball valves must be durable and easy to use. The design of pigging ball valves is a continuing challenge for engineers.

SUMMARY OF THE INVENTION

According to an aspect of the invention, there is provided an improved pigging ball valve with a housing and ball core supported for rotation within the housing. The ball core sits on a valve seat, which is supported by a seat carrier. One aspect of the invention is that the valve seat carrier has three distinct diameters that locate the seat in the housing and thus provides an anti-cocking feature. A further aspect of the invention is the provision of a seat insert with a pressure sealing surface and wiper lip, preferably on the outer diameter of the pressure sealing surface. A still further aspect of the invention is the provision of an internal seat deflector ring, preferably on an inner diameter of the pressure sealing surface. The seat carrier is preferably spring loaded.

These and other aspects of the invention are described in the detailed description of the invention and claimed in the claims that follow.

BRIEF DESCRIPTION OF THE DRAWINGS

There will now be described preferred embodiments of the invention, with reference to the drawings, by way of illustration only and not with the intention of limiting the scope of the invention, in which like numerals denote like elements and in which.

DETAILED DESCRIPTION OF PREFERRED EMBODIMENTS

In this patent document, "comprising" means "including" and does not exclude other elements being present. In addition, a reference to an element by the indefinite article "a" does not exclude the possibility that more than one of the elements is present.

Figure 1:
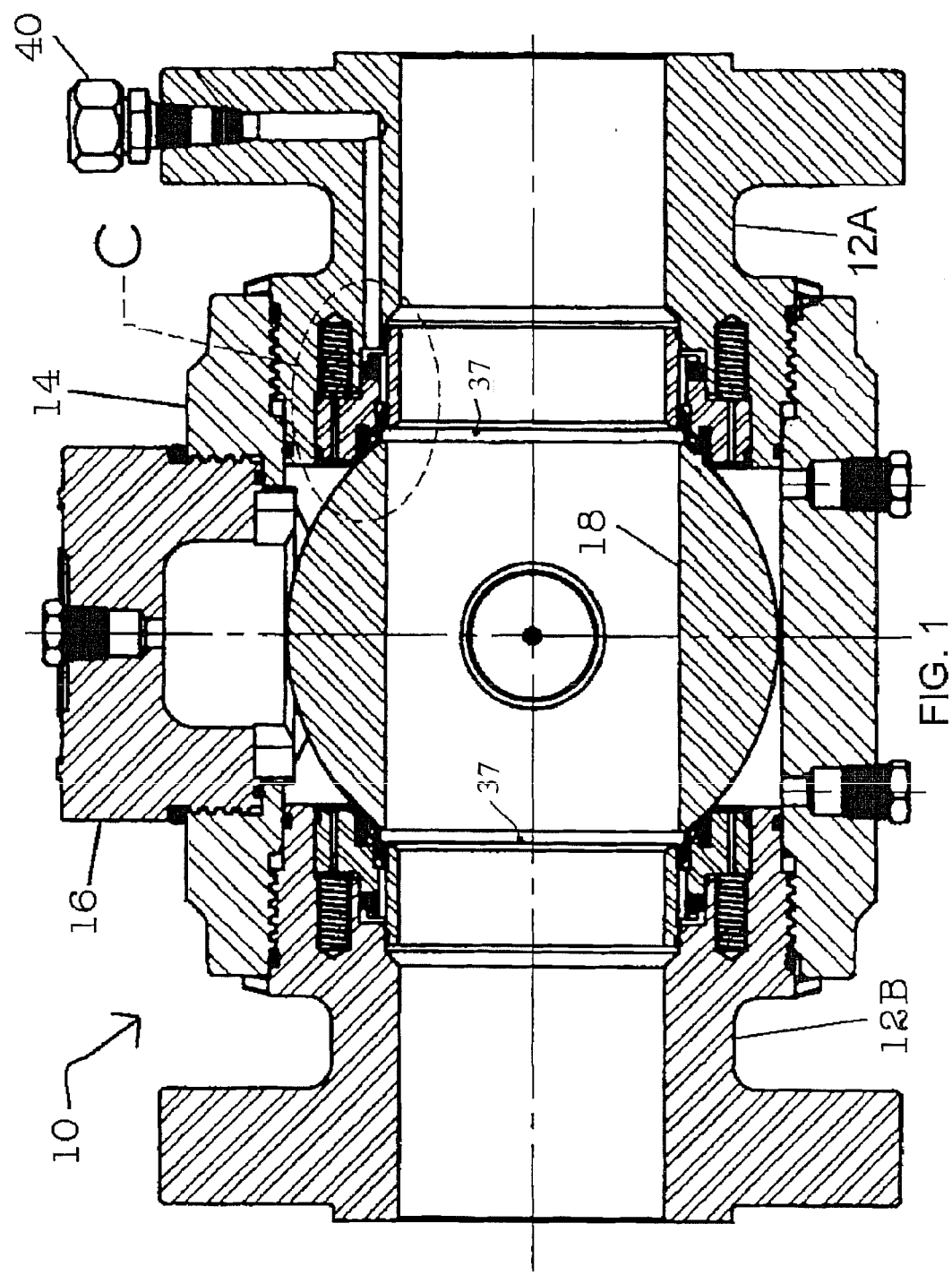
FIG. 1 shows a section through a pigging ball valve according to the invention.

Referring to FIG. 1, the main components of a pigging ball valve 10 are a housing 12 formed of two tailpieces 12A and 12B, a central portion 14, in which the tailpieces 12A and 12B are threaded, an entry port plugged with entry plug 16 on one side of the housing 12 and a ball core 18. Removal of the entry plug 16 provides for insertion of a pig (not shown) into a pipeline (not shown) or removal of the pig from the pipeline through the entry port. The flanged ends of the tailpieces 12A and 12B typically bolt to corresponding flanges of the pipeline. The ball core 18 is mounted for rotation within the housing 12 between a position for transferring a pig to and from the entry port and a position for transferring the pig to and from the pipeline. These general features of a pigging ball valve mentioned in this paragraph are conventional.

Figure 2:
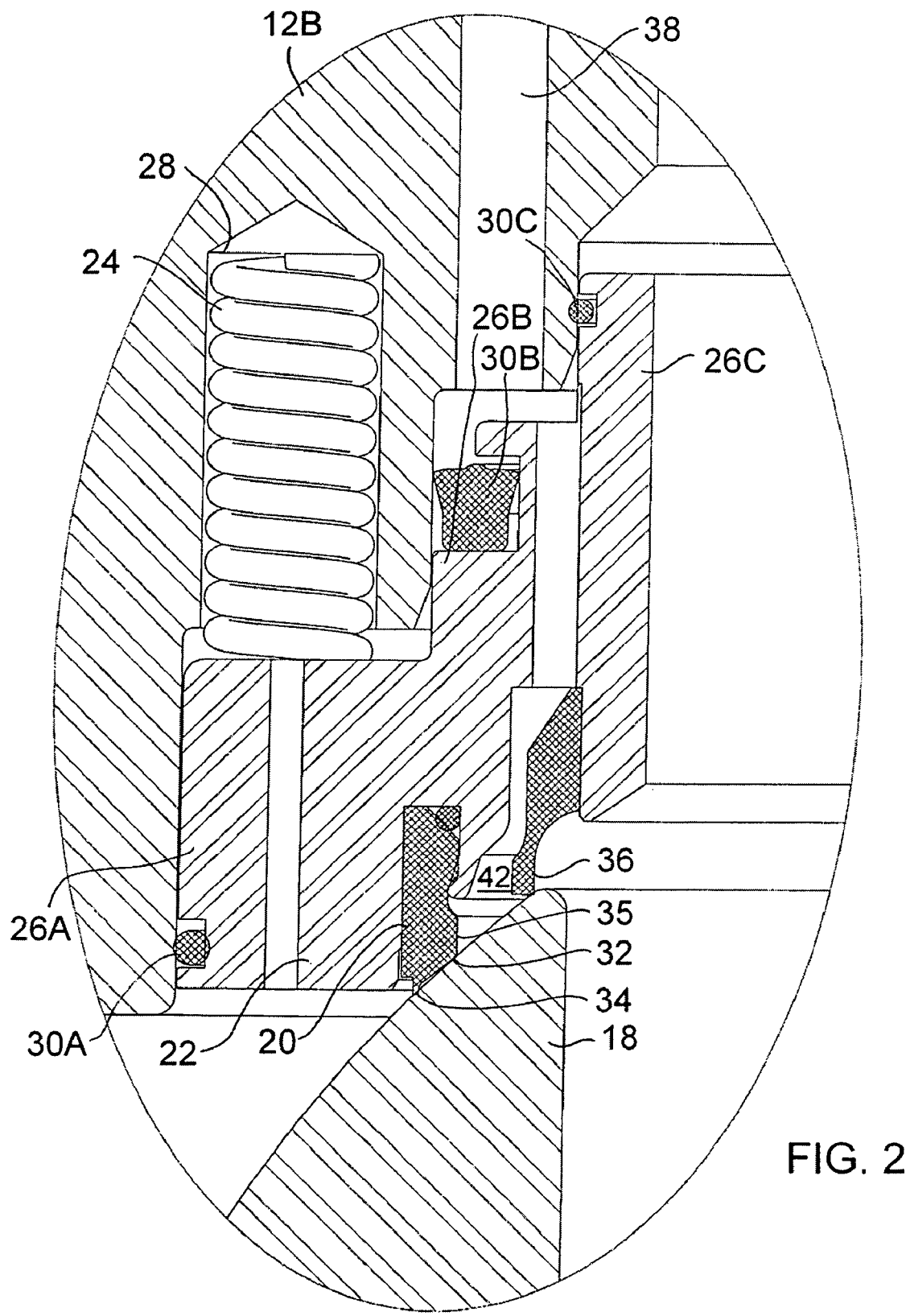
FIG. 2 is a detail of the region marked C in FIG. 1.

Also shown in FIG. 1, but more particularly shown in FIG. 2, on each side of the ball core 18 are annular valve seats 20 held in place within the housing by annular valve seat carriers 22. Since both valve seats 20 are identical and both valve seat carriers 22 are identical, only one of each, the one shown in FIG. 2 will be described here. The annular valve seat carrier 22 is preferably spring supported within the housing 12 by springs 24 and has three distinct diameters 26A, 26B and 26C to locate the annular valve seat carrier 22 within the housing 12. The diameters 26A, 26B and 26C are each cylindrical portions having substantially uniform diameter extending in the longitudinal direction along the bore of the pipeline. Springs 24 are preferably loaded between cylindrical portion 26A and a stop 28 on the housing 12. The annular seat carrier 22 has seals 30A, 30B and 30C respectively on each diameter 26A, 26B and 26C for sealing between the seat carrier 22 and housing 12. The provision of three diameters 26A, 26B and 26C helps prevent cocking of the seat carrier 22 within the housing 12 and thus helps maintain a constant seal between the valve seat 20 and ball core 18.

The valve seat 20 is held within the diameter 26A and sealed against the ball core 18 in the following manner. The valve seat 20 has a pressure sealing surface 32 and a wiper lip 34. The wiper lip 34 is located at the outer diameter of the pressure sealing surface 32, and is preferably formed integrally with the pressure sealing surface 32. The pressure sealing surface 32 is preferably made of a relatively soft material. The wiper lip 34 is provided to clean the surface of the ball core 18 and help prevent contamination from damaging the sealing surface 32. The wiper lip 34 is typically scoured and performs no sealing function. The pressure sealing surface 32 is preferably provided with a relatively small differential pressure area 35 where the line pressure acts on the seat 20 to push against the ball core 18. This is desirable to reduce the torque required to operate the pigging ball valve 10.

The valve seat 20 also includes a seat deflector ring 36 located within the valve seat 20 interior to the pressure sealing surface 32. The seat deflector ring 36 is provided with openings 37 (FIG. 1) around the seat 20 and allows line pressure to act on the seat 20. The seat deflector ring 36 does not act as a seal but helps contain and direct grease, sealants and cleaners around the surface of the ball core 18. The seat deflector ring 36 also cleans the surface of the ball core 18, to help prevent damage to the pressure sealing surface 32. A grease introduction port 38 extends from plug 40 to a region 42 located between the pressure sealing surface 32 and the seat deflector ring 36 for supply of grease sealants and cleaners to the seat 20.

The annular valve seat carrier 22 is spring supported within the housing 12 by the springs 24 to provide a high and low pressure bubble tight seal. The spring loading of the seats 20 also relieve pressure build-up at the seal seat 20 when the pigging ball valve 10 is in the closed position. The metal elements shown here are preferably steels suited to the intended application, by way of cost, corrosion resistance and durability. The elastomeric elements, the seal seat 20 and deflector ring 36 may be made out of any suitable material such as a nylon-based material such as Devlon™, Nylatron™ or GSM™s.

Immaterial modifications may be made to the embodiments described here without departing from the invention.

What is claimed is:

1. A pigging ball valve, comprising:
   a housing having an entry port for insertion of a pig into a pipeline and removal of a pig from a pipeline;
   an annular valve seat carrier supported within the housing;
   a ball core mounted for rotation within the housing between a first position for transferring a pig to and from the entry port and a second position for transferring the pig to and from the pipeline;
   a valve seat held by the annular valve seat carrier and sealed against the ball core, the valve seat having a pressure sealing surface contacting the ball core;
   a seat deflector ring carried by the annular valve seat carrier, the pressure sealing surface having an inner diameter and an outer diameter, the seat deflector ring being located inside the inner diameter of the pressure sealing surface and contacting the ball core to effect a scraping action on the ball core when the ball core rotates within the housing, the seat deflector ring being provided with flow passages to permit transfer of line pressure onto the valve seat during operation; and
   a grease introduction port located in the annular valve seat carrier between the pressure sealing surface and the seat deflector ring.

2. The pigging ball valve of claim 1 in which the annular valve seat carrier is spring supported within the housing.

3. The pigging ball valve of claim 1 in which the annular valve seat carrier has three distinct diameters to locate the annular valve seat carrier within the housing.

4. The pigging ball valve of claim 1 in which the valve seat comprises a wiper lip located at the outer diameter of the valve seat.

5. A pigging ball valve, comprising:
   a housing having an entry port for insertion of a pig into a pipeline and removal of a pig from a pipeline;
   an annular valve seat carrier supported within the housing;
   a ball core mounted for rotation within the housing between a first position for transferring a pig to and from the entry port and a second position for transferring the pig to and from the pipeline;
   a valve seat held by the annular valve seat carrier and sealed against the ball core, the valve seat having a pressure sealing surface contacting the ball core and the valve seat comprising a wiper lip located at the outer diameter of the valve seat;
   a seat deflector ring carried by the annular valve seat carrier, the pressure sealing surface having an inner diameter and an outer diameter, the seat deflector ring being located inside the inner diameter of the pressure sealing surface and contacting the ball core; and
   a grease introduction port located in the annular valve seat carrier between the pressure sealing surface and the seat deflector ring.

6. The pigging ball valve of claim 5 in which the annular valve seat carrier is spring supported within the housing.

7. The pigging ball valve of claim 5 in which the annular valve seat carrier has three distinct diameters to locate the annular valve seat carrier within the housing.

* * * * *